United States Patent [19]

Levine et al.

[11] Patent Number: 5,442,795
[45] Date of Patent: Aug. 15, 1995

[54] SYSTEM AND METHOD FOR VIEWING ICON CONTENTS ON A VIDEO DISPLAY

[75] Inventors: Stephen R. Levine, North Andover; Stephen P. Boylan, Somerville; Michael W. Schirpke, Bedford; Karen Donoghue, Melrose, all of Mass.; Alex J. Harui, Derry, N.H.

[73] Assignee: Wang Laboratories, Inc., Billerica, Mass.

[21] Appl. No.: 616,812

[22] Filed: Nov. 19, 1990

Related U.S. Application Data

[63] Continuation of Ser. No. 307,699, Feb. 7, 1989, abandoned, which is a continuation-in-part of Ser. No. 245,419, Sep. 16, 1988, abandoned, and a continuation-in-part of Ser. No. 200,091, May 27, 1988, abandoned.

[51] Int. Cl.$^6$ .................................................. G06F 3/14
[52] U.S. Cl. ..................................... 395/800; 395/159; 364/927.2; 364/927.632; 364/DIG. 2
[58] Field of Search ... 364/200 MS File, 900 MS File, 364/927.2, 927.632, DIG. 2; 395/800, 159

[56] References Cited

U.S. PATENT DOCUMENTS

| | | | |
|---|---|---|---|
| 3,705,956 | 12/1972 | Dertouzos . | |
| 4,387,395 | 6/1983 | Shaphorst | 358/140 |
| 4,424,575 | 1/1984 | Clarke et al. | 364/900 |
| 4,475,239 | 10/1984 | Raamsdonk | 382/57 |
| 4,488,000 | 12/1984 | Glenn | 178/18 |
| 4,514,818 | 4/1985 | Walker | 364/521 |
| 4,516,156 | 5/1985 | Fabris et al. | 358/85 |
| 4,552,991 | 11/1985 | Hulls | 178/19 |
| 4,562,304 | 12/1985 | Ward et al. | 178/18 |
| 4,570,033 | 2/1986 | Hulls | 178/19 |
| 4,575,580 | 3/1986 | Jandrell | 178/18 |
| 4,577,057 | 3/1986 | Blesser | 178/18 |
| 4,580,007 | 4/1986 | Searby | 178/18 |
| 4,582,955 | 4/1986 | Blesser | 178/19 |
| 4,633,416 | 12/1986 | Walker | 364/521 |
| 4,633,436 | 12/1986 | Flurry | 364/900 |
| 4,638,119 | 1/1987 | Blesser et al. | 178/19 |
| 4,644,102 | 2/1987 | Blesser et al. | 178/19 |
| 4,649,380 | 3/1987 | Penna . | |

(List continued on next page.)

FOREIGN PATENT DOCUMENTS

| | | | |
|---|---|---|---|
| 0159400 | 10/1985 | European Pat. Off. | 364/709 |
| 218128 | 10/1985 | Japan . | |

OTHER PUBLICATIONS

Goodman, Danny, *The Complete HyperCard Handbook* (Bantam Books, 1987) pp. 32–34.

"Designing the Star User Interface," by Smith, D. C., et al, Byte Magazine, Apr. 1982, pp. 242–282.

"Visual Languages: A Tutorial and Survey," by Chang, Shi-Kuo, I.E.E.E. Software, Jan. 1987, v. 4, No. 1, pp. 29–39.

Commodore Amiga A500 User's Manual, 1987, pp. 5-30 through 5-47.

Microsoft Corporation, *Show Partner User's Guide* (1986), Chaps. 3, 4, pp. 27–48.

"Mactinosh MacPaint," copyright 1983, by Apple Computer, Inc., Cupertino, Calif., pp. 1–32.

(List continued on next page.)

*Primary Examiner*—Eric Coleman
*Assistant Examiner*—John Harrity
*Attorney, Agent, or Firm*—Kenneth L. Milik

[57] ABSTRACT

A data processing system provides a folder icon for holding representations of sheets of information in user desired order. The folder has a closed position in which a user generated label is viewable. The label is designed through a processor window activated through a tab portion of the closed folder icon. The folder also has an open position for viewing the sheets held in the folder. The folder is changed between its open and closed positions by activation of a main body portion of the closed icon and the tab portion of the open folder icon. The open folder icon provides addition or removal of representations of sheets of information from and to an area outside of the folder in a screen view.

30 Claims, 11 Drawing Sheets

U.S. PATENT DOCUMENTS

| | | | |
|---|---|---|---|
| 4,677,428 | 6/1987 | Bartholow | 340/708 |
| 4,688,031 | 8/1987 | Haggerty . | |
| 4,714,918 | 12/1987 | Barker et al. | 340/724 |
| 4,734,619 | 3/1988 | Havel . | |
| 4,755,809 | 7/1988 | Ikegami et al. | 340/724 |
| 4,899,136 | 7/1990 | Beard et al. | 364/900 |

OTHER PUBLICATIONS

"Method for Creating Annotation Data," IBM Technical Disclosure Bulletin, vol. 28, No. 4, Sep. 1985, pp. 1623–1628.

"The Complete Book of Macintosh Assembly Language Programming," Weston, D., published 1987 by Scott, Foresman and Co., Ill., pp. 27–147.

"The Small talk Environment" by Tesler, L., Byte Magazine, Aug. 1981, pp. 90–144.

"The Lisa Computer System: Apple Designs a New Kind of Machine," by Williams, G., Byte Magazine, Feb. 1983, pp. 33–50.

"The Apple Mcintosh Computer: Mouse-window-desktop Technology Arrives for Under $2500," by Williams, G., Byte Magazine, Feb. 1984, pp. 30–54.

"Method of Multiple Selection of Icons On a Computer Display By Using a Pointing Device," IBM Technical Disclosure Bulletin, vol. 31 No. 1, Jun. 1988, pp. 19–20.

"Macintosh," published 1983 by Apple Computer, Inc., Cupertino, Calif., pp. 13–109 & 147–154.

"System for Integrating and Collating Audio and Text, and For Text Creation and Editing," by P. D. Welch, IBM Technical Disclosure Bulletin, vol. 16, No. 2, Jul. 1973, pp. 500–503.

"A Pair of Digitizing Tablets," Macworld, published Mar. 1987 by PCW Communications, Inc., San Francisco, Calif., pp. 143–144.

"Put–That–There": Boice and Gesture at the Graphics Interface by Richard A. Bolt, in *ACM* 1980, pp. 262–270.

Flow Chart Generator, Patent Abstracts of Japan, vol. 7, No. 198, (P-220)(1343) Sep. 2, 1983, JP-A-58-96360.

European Patent Application No. 0 203 314, Specifying Measurements on a Page by Pointing, IBM, Dec. 3, 1986.

IBM Technical Disclosure Bulletin, Include Non–Text Objects in Margin Text, vol. 30, No. 7, Dec. 1987, p. 348.

*Hypercard User's Guide*, Apple Computer, Inc. copyright 1988 pp. 106–123, 146–163.

*Macintosh*, by Apple Computer, Inc., Cupertino, Calif., pp. 1–109 and 147–155, copyright 1983.

*Macintosh System Software User's Guide–Version 6.0* ©1988, Cupertino, Calif., Apple Computer, Inc.

"Icon–based Human-computer Interaction" *Int. J. Man–Machine Studies*; (1986) pp. 519∝543.

SYSTEM AND METHOD FOR VIEWING ICON CONTENTS ON A VIDEO DISPLAY

RELATION APPLICATIONS

This is a continuation of application Ser. No. 07/307,699, filed on 7 Feb. 1989, now abandoned, which is a continuation-in-part of U.S. application Ser. No. 245,419, filed on Sep. 16, 1988, for "Document Manipulation in a Data Processing System" assigned to the assignee of the present invention, now abandoned, and of U.S. application Ser. No. 200,091, filed on May 27, 1988, for "Apparatus for Manipulating Documents in a Data Processing System", now abandoned.

BACKGROUND OF THE INVENTION

In many of today's businesses, various tasks are now automated by computers. For instance, a word processor enables the reorganizing and rewriting of documents without the retyping known in the past. In addition, various documents may be organized and stored by a computer filing system which allows retrieval by name, by chronological or alphabetical order, or by other user-desired identification. Another example is a mail system on a network of computer terminals which allows messages to be sent to and from users of the network. Also, a phone system may be connected to a mail system which in turn enables phone messages to be stored and later forwarded to users. These and other computer devices enable various daily office tasks to be accomplished more quickly and more efficiently.

However, most computer devices require the user to be computer literate and to learn commands to direct the computer to perform the desired tasks. In more recent computer developments, user interaction with the computer, or as generally referenced in the art, the user interface, comprises menus or a series of commands from which to choose. For each decision juncture during the use of a computer device, an appropriate menu is displayed to the user to prompt the user on the available, proper commands at the juncture. The user only needs to choose the command from the menu which will direct (in part or in full) the computer to perform the desired task. Due to the menu providing the proper possible commands, the user does not have to remember or recall commands to the computer. Hence, the menus are considered to make computer devices more "user friendly".

Although the choices on a menu generally are descriptive phrases written in terms which are more common to our everyday language rather than in a coded or technical computer language, the descriptive phrases may not initially have meaning, or at least the proper meaning, to a first-time user or a user who is not computer literate. The user does have to learn the respective meaning of each menu choice.

In addition, the input devices through which the user communicates commands or menu selections to the computer pose various complexities. For example, a keyboard requires knowledge of the position of each key in order for a user to use the keyboard proficiently. A mouse, being a relative movement device, requires certain eye-hand coordination and is operated by unnatural movements such as single and double clicking at appropriate times which must be remembered by the user.

In turn, many office personnel do not make use of computer devices because of the time and complexity in learning to operate these devices.

Accordingly, there is a need to make computer devices, and particularly those for office use, more "user friendly" and readily useable especially to first-time and computer illiterate users.

SUMMARY OF THE INVENTION

The invention of the parent application discloses a computer device which provides a graphically based user interface that simulates an office desk and user interaction with items on the desk. The items include (i) documents which are represented by miniaturized images called stamps, and (ii) various desk tools or accessories which are represented by icons. In general, that disclosed computer device is employed by a terminal or a network of terminals of a digital processing system. Each terminal typically provides a monitor screen which displays various views to the user, a keyboard which enables typed input to the digital processing system, and an electronic stylus which enables further user interaction with the digital processing system but in a natural format.

The natural format by which the user communicates through the electronic stylus is one aspect of the user interface of the invention of the parent application. A second aspect of the user interface disclosed by that invention is the screen view of the user's system desk, a computer work area distinguished from the user's office desk and displayed on the terminal monitor screen to provide a representation of all the documents and accessories which are currently at the user's disposal. The present invention provides a folder accessory for the desk view, in which user selected documents are held in a desired order.

In a preferred embodiment a folder includes two positions, open and closed. In either position a user is able to move the folder and its contents in total to reposition the folder and contents on the system desk as desired. Such repositioning is accomplished by the user acting on a main body portion of the icon representing the folder (i.e. a portion of the folder icon which is not covered by any stamp when the folder is open) with the stylus. Specifically, the stylus is operated in what is called a "touch and move" manner on the folder icon.

In addition, with the folder closed, the user may label the folder by activating a tab or labelling area of the folder. Activation is by a "touch and lift" operation of the stylus on the labelling area of the folder icon. Upon activation of the labelling area, a processing window is presented and enables the user to hand write with the stylus and/or type with the keyboard a visually identifiable label design on the main body portion of the folder. Menu selections or similar elements are used to end the window and the labelling process. Upon returning to a screen view of the system desk, the icon of the folder bears the label created by the user through the window process.

To open a folder, the user "touches and lifts" the stylus on the main body portion of the folder icon. The open folder has two half sections positioned adjacent each other. In the open position of a folder, the user views various stamps of documents which the user has placed in the folder. The folder is always initially opened to the beginning of the stack of stamps held in the folder. Thereafter, the user is able to page through the stamps in a manner similar to paging through sheets of papers in a common office folder which forms a stack half on each half section or side of the open folder. Each stamp is moved from one side of the folder to the other side by a touch and move operation of the stylus on the stamp.

In one embodiment, the stamps are shown face up on the side of the folder on which the initial stack of stamps sits and shows the stamps face down on the opposite side of the folder to which the stamps are moved during the paging process. In an alternative embodiment, the stamps are shown right side up on both sides of the folder such that a user is able to view the stamps on either side of the folder.

The user may also view a full screen-size image of the document represented by a certain stamp. To do so, the user pages through the stack of stamps held in the folder until the desired stamp is exposed (i.e. positioned on top of a stack half on either side of the folder). The user then operates the stylus in the touch and lift manner on the stamp to select the stamp. In response to such selection, the document corresponding to the selected stamp is displayed in a full screen size view. In that view the user is able to page through the document itself if it is a multi-page document and read and/or annotate the document. A menu selection enables the user to return to the desk view with the folder opened to the last position before full screen view of the selected document and the stamp of the viewed document in the folder with any annotations made to the stamp during the full screen viewing.

In the open position of a folder, the user also may remove documents therein by a touch and move operation of the stylus on the stamp of the desired document. Before a document stamp may be removed from a folder the stack of stamps must be paged through until the desired stamp is exposed (i.e. positioned on the top of a stack half on either side of the open folder). Once the desired stamp is exposed, it is removed from the stack half and repositioned to a desired area of the system desk.

In a similar manner, stamps of documents may be added to a desired position in the stack in the open folder. The user pages through the stack of stamps in the folder to a desired position. Next the user operates the stylus in the touch and move manner to reposition a desired stamp from the system desk onto the top of the stack half on one side of the folder. Thereafter, the user may page through the stack halves or close the folder with the desired stamp effectively inserted into the contents of the folder at the position of the exposed end of the stack half on the side of the folder on which the stamp was placed.

To that end, the ordering of the stamps in the folder is changed only by the removal or insertion of a stamp by the user with the folder contents having been paged through to a desired point, just as is done with an everyday folder file.

To close an open folder, the user touches and lifts with the stylus on tab area of the open folder icon. Upon closing, the folder holds the contents in the user generated order. A reopening of the folder produces the contents in that order but with the stamps in one stack, the beginning of the stack shown on top and the rest of the stamps illustrated underneath.

In addition, the folder icon may represent a folder which opens and closes horizontally (i.e. right to left, left to right) or a folder that opens and closes vertically (above to below, below to above).

In a preferred embodiment, the desk view provides a trash barrel or similar icon to provide means of removing a desired item from the screen view. The user moves the icon of the desired item to the upper side of the trash barrel icon with the touch and move operation of the stylus. Upon placing the subject item icon on the upper side of the trash barrel icon, the processing system removes the subject item from the desk view.

In the case of a folder being disposed through the trash barrel icon, the contents of the folder together with the folder itself are removed from the desk view. In an alternative embodiment only empty folders in their closed positions are allowed to be placed on the trash barrel icon to remove the folder from the desk view.

Upon retrieval from the trash barrel, the folder returns empty in one embodiment and with its contents in another embodiment. Retrieval is preferably through the upper side of the trash barrel icon with the stylus operated in a touch and move manner.

BRIEF DESCRIPTION OF THE DRAWINGS

The foregoing and other objects, features and advantages will be apparent from the following more particular description of a preferred embodiment of the invention, as illustrated in the accompanying drawings. The drawings are not necessarily to scale, emphasis instead being placed upon illustrating the principles of the invention.

DETAILED DESCRIPTION OF THEN PREFERRED EMBODIMENT

Generally speaking, the present invention is a part of a graphically based user interface in a computer device which simulates a desk, referred to as the user's system desk, and user interaction with items on the desk. Details of this graphical interface and user interaction therewith are found in parent U.S. application Ser. No. 245,419 and are incorporated herein by reference. The details are only summarized hereafter as necessary for the understanding of the present invention.

Briefly, the interface provides a major screen view called the "desk view" in which the user's system desk is illustrated with "paper" documents, trays and/or folders for holding documents in user desired order, and various accessories, such as but not limited to a stapler, means for mailing documents, a trash barrel and means for providing blank paper. All items on the illustrated desk are movable and are able to be placed in any position on the desk by movements of the stylus on a writing surface which mimic human motions of grabbing an item, moving an item and pointing to an item to establish selection of the item. The items are indicated in the screen view of the user's system desk by icons or by illustrative representations, and movements of the stylus with respect to an item are indicated in the screen view by various cursors.

In particular, paper documents are illustrated on the user's system desk by reduced images called stamps, and items which provide a process or activity are represented on the user's system desk by icons. Some icons have various regions which, with certain treatment, provide different operation or use of the item represented by the icon. For example, the icon for a tray is repositioned by a touch and move operation of the stylus on any visible portion (i.e. uncovered by other icons and/or reduced images) of the icon, and the icon enables labelling of the tray by a touch and lift operation of the stylus on the designated label area of the icon followed by a writing/erasing use of the stylus thereon. Hence, different parts of the icon provide different effects with respect to operation of the stylus therewith.

The present invention provides a folder icon for holding stamps as desired by the user. Like the other icons and stamps, folder icons are repositionable on the desk by a touch and move operation of the stylus. Also, like tray icons, folder icons are labellable. In addition, however, folder icons are able to be opened for reviewing document stamps held therein and shut to cover the contained document stamps.

Figure 1:
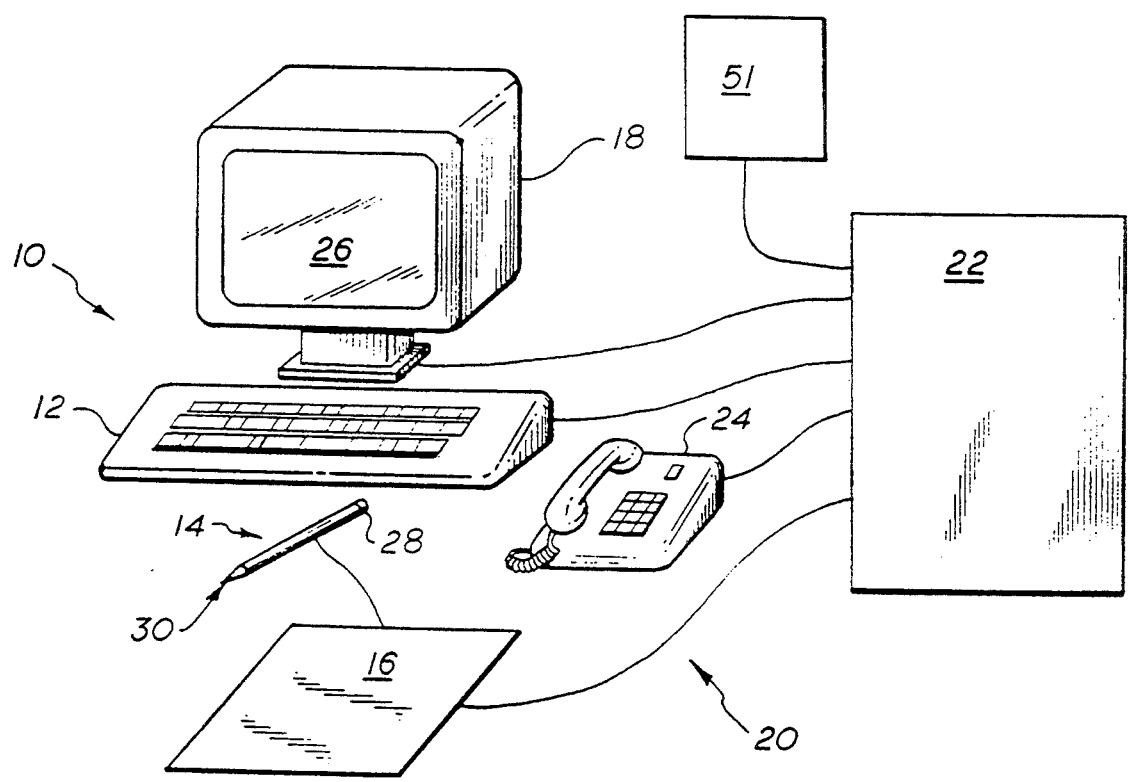
FIG. 1 is a schematic view of a data processing system which embodies the present invention.

The foregoing and other features of the present invention are described in more detail and are more readily understood with reference to a data processing system which implements the desk interface and which is illustrated in FIG. 1. The data processing system 20 includes a computer terminal 10 with a keyboard 12 and a display unit 18, a two-ended electronic stylus 14 and an electronic tablet 16, all of which are connected to and driven by a digital processor 22. Digital processor 22 may be of the multi-task type but a single task type is assumed in the description of the preferred embodiment. Preferably, an audio assembly having an input and output port, such as a telephone set 24, is also connected to the terminal 10 for combining audio information with visual information input through the stylus 14 and keyboard 12. In addition, a facsimile transmitter and receiver 51 is coupled to terminal 10 for providing further communication means.

It is understood that display unit 18 provides a video display but is not limited to a raster type CRT and may be of an LCD or gas plasma type display unit or of other display technology.

The stylus 14 is used on an upper planar surface of the tablet 16 to perform certain tasks such as repositioning displayed items, or selecting displayed items for further processing. The actions of the stylus 14 on the surface of the tablet 16 are displayed on display unit 18 and the positions on the tablet have a one to one correspondence with the view 26 displayed on the display unit 18. Thus, as the user applies the stylus 14 to the tablet surface, an image representation of what the user is doing with the stylus is provided in the view 26 of display unit 18.

In the alternative, the tablet 16 and display unit 18 may be a single unit such that the stylus 14 is operated directly on the screen of the display unit 18.

The two-ended stylus 14 operates from either end, the writing tip end 30 or the eraser end 28. When either the writing tip end 30 or the eraser end 28 is in close proximity (about 2 cm or less) to the surface of the tablet 16, that end is sensed and indicated in the view 26 of display 18 by a representative cursor. Two factors are used in sensing the proximity of either ends 28, 30 of stylus 14 to the surface of table 16. The factors include a height position along an axis perpendicular to the tablet surface (i.e. z-axis) as detected by the circuits of the tablet 16 and a pressure indication sensed by a pressure transducer in the stylus 14.

Preferably, tablet 16 comprises an x- and y-axis sampling circuit, where x and y are orthogonal axes in the plane of the tablet surface, and a separate z-axis sampling circuit. The x- and y-axis and z-axis sampling circuits operate on a predetermined schedule and generate signals which are converted into respective digital values. The digital values are used in a relationship known in the art to provide an indication of position of the stylus 14 relative to the tablet 16 along the x, y and z-axes.

In addition, the writing tip end 30 and the eraser end 28 of the stylus 14 are alternately driven by a tablet processor. When one end is moved into and sensed in proximity of the tablet surface, then just that end is driven. The driven stylus end responds to four different manners of operation to provide different effects. A "touch and lift" operation is used for selecting an item exhibited on display unit 18. Preferably, once the writing tip end 30 or the eraser end 28 makes contact with the tablet surface, the "touch" part of the operation is defined but the user must lift the stylus end 28, 30 from the tablet surface within the succeeding second or so to define the "lift" portion of the operation. If the user delays in lifting the stylus end 28, 30, then the "touch and lift" operation is not invoked and no effect results.

A "touch and move" enables the user to move a displayed item anywhere in the view 26 of display unit 18. The operation is invoked upon the user placing the writing tip end 30 or the eraser end 28 on the tablet surface and moving the stylus end 28, 30 while maintaining it in contact with the tablet surface for more than a preset number of pixels, for example, four pixels.

The third and fourth manners of operation depend on the stylus end being driven. In the case of the writing tip end 30 of the stylus 14, use of the end 30 in a writing manner inserts markings on a chosen displayed document. In the case of the eraser end 28 being driven, erasing with the eraser end 28 deletes certain writing tip end markings or portions thereof. In particular, the eraser end 28 when driven alone allows operation in a manner which removes markings or parts thereof that have been made by the writing tip end 30 within the same session of writing/erasing on a chosen displayed item. Further, the eraser end 28 removes markings in a wider band than the band in which the writing tip end 30 writes. Whether movement causes writing/eraser or movement of an item depends on whether a writing surface is displayed and whether the cursor is at the edge or center of the writing surface.

Optionally, the stylus 14 may be of other designs, for example single working ended. In that case, erasure may be provided through keyboard operations or the like.

As illustrated in FIGS. 2a–2d, the desk view 32 is central to the various tasks and applications of the system 20 and serves as a visual interface between the user and digital processor 22. In a preferred embodiment, the desk view 32 provides a user system desk 36 which represents the computer work area of the user and appears as the background of the desk view 32. On the system desk 36, the desk view 32 provides miniaturized images or stamps 34 of various documents which have been created and/or annotated by the annotation capabilities of system 20. Although the stamp representations of the documents are specifically similar to icons, the stamps 34 are more functional or informative than icons. In particular, various direct treatment and direct manipulation of stamps 34 in desk view 32 are accomplished by applying the different stylus operations to the stamps.

For instance, the full screen image of a document may be viewed on screen 26 from the desk view 32 by selection of the corresponding stamp 34. Selection of the stamp 34 during the desk view 32 is accomplished by the touching and lifting of one end of stylus 14 on the tablet position which corresponds to a position within bounds of the corresponding stamp 34 in the desk view 32. Upon completion of the touch and lift operation of the stylus 14, a full screen view of the document is displayed on display unit 18. Thereafter, the document may be annotated in full screen view by the stylus 14 operated in its writing and erasing manners, by the keyboard 12 and by audio input through the audio assembly 24.

Figure 2A:
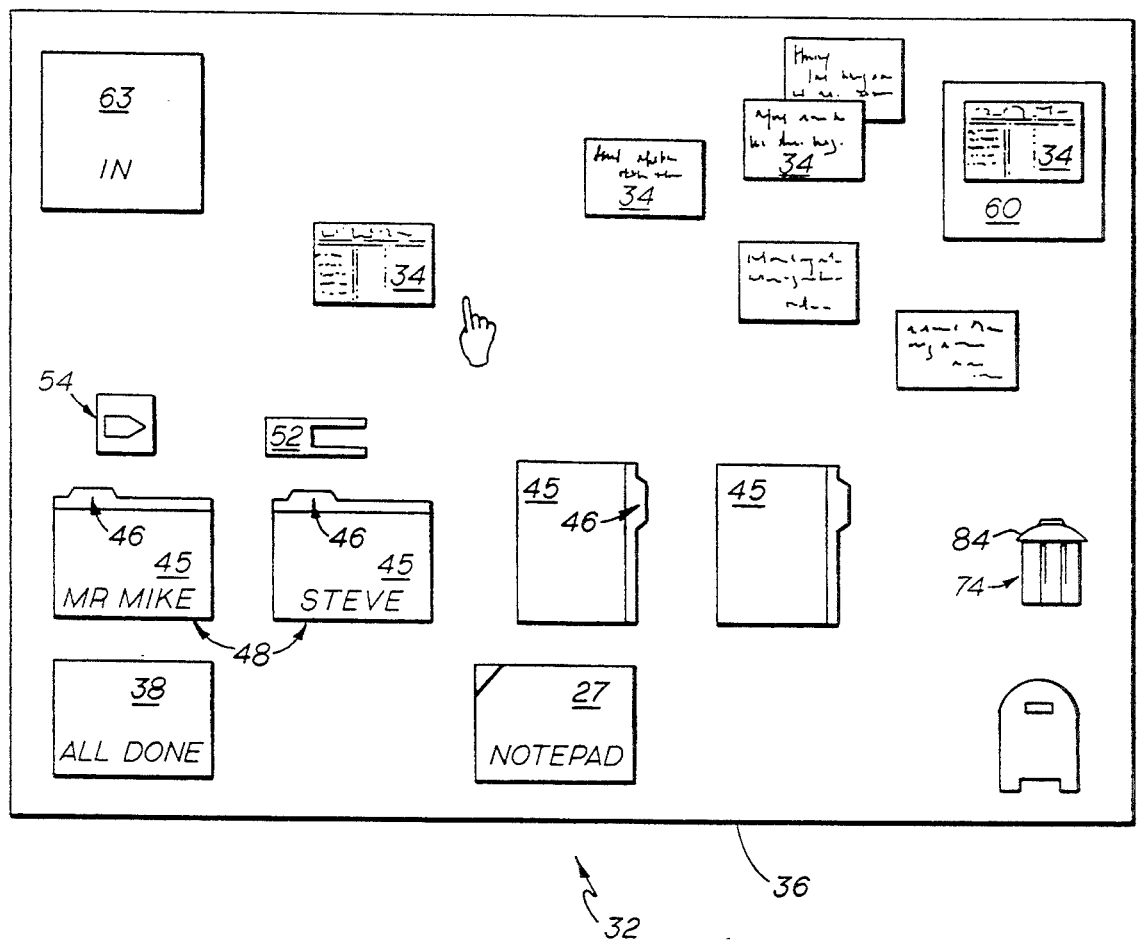
FIGS. 2a–2d are illustrations of a desk view displayed during use of the system of FIG. 1.
Figure 2B:
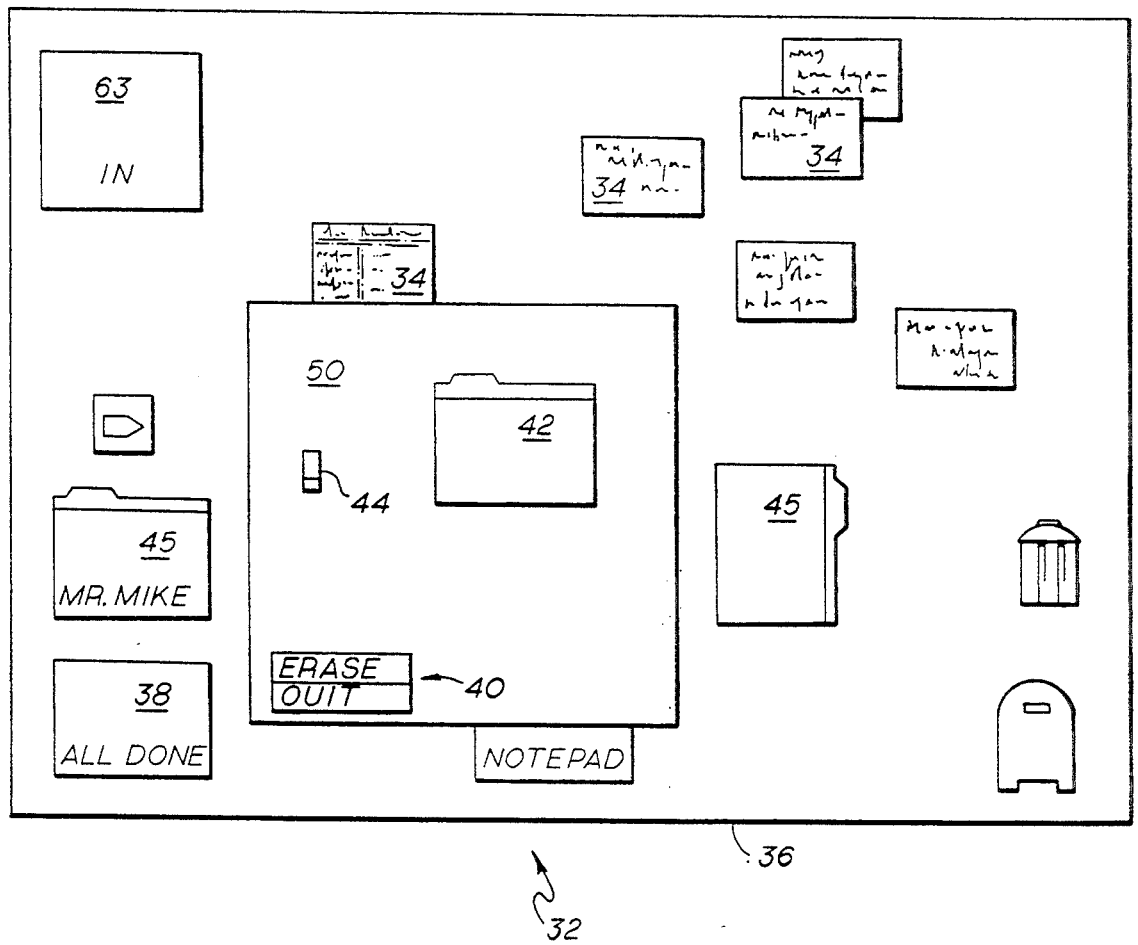
Figure 2C:
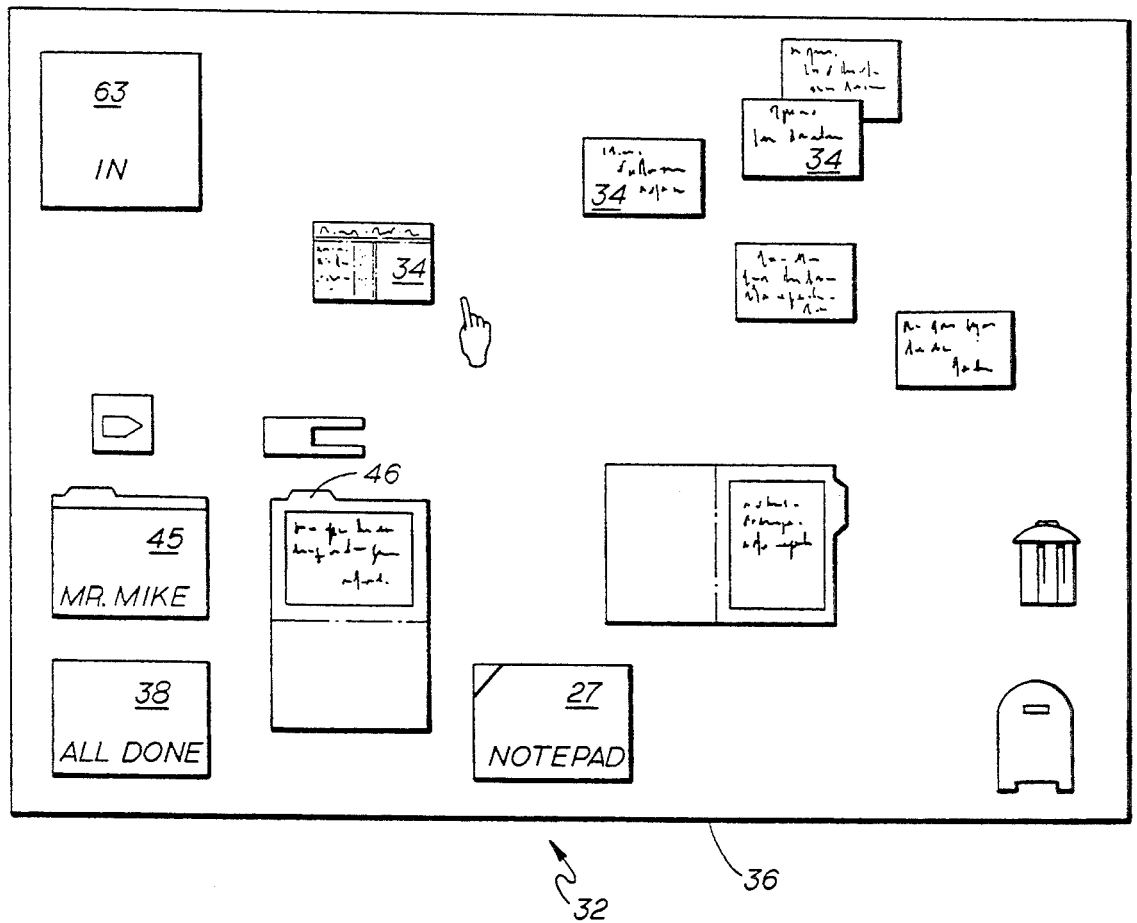
Figure 2D:
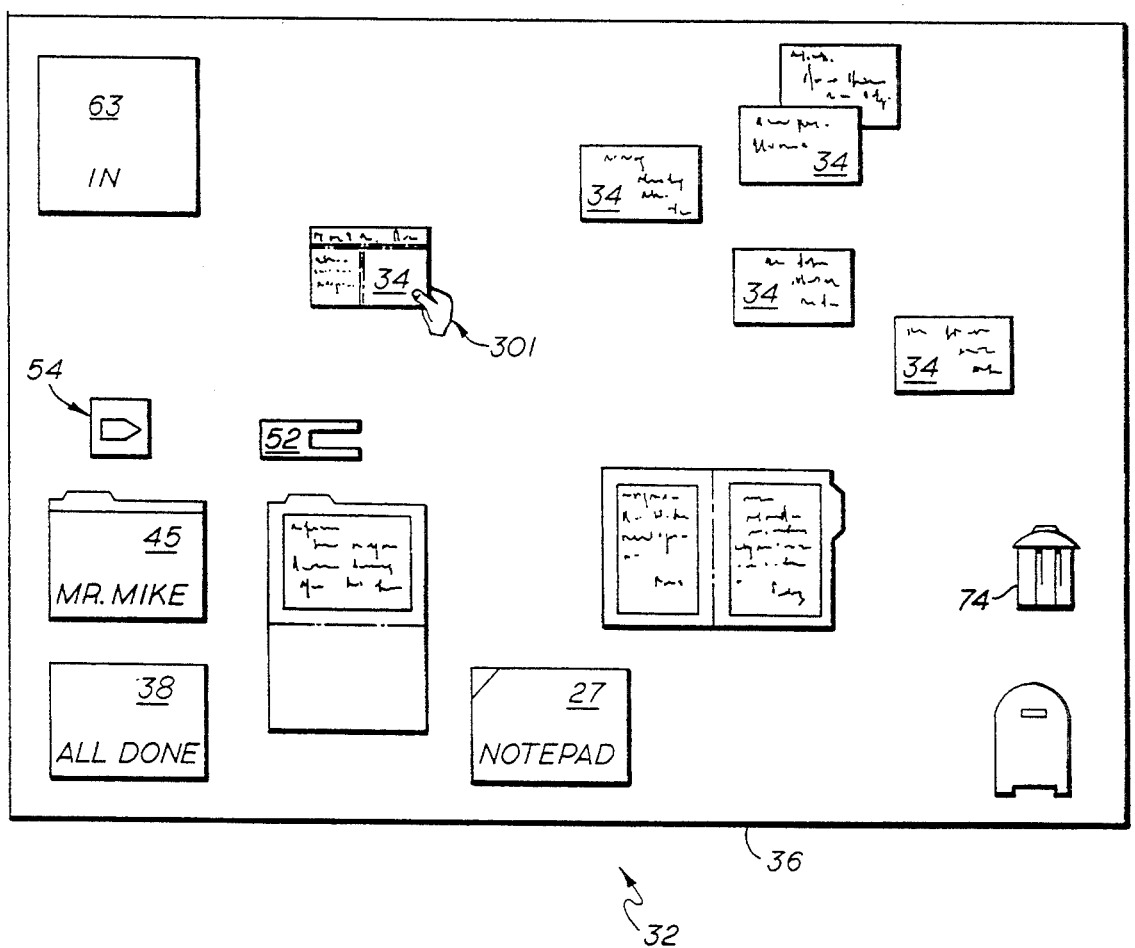

Also the stamps 34 of a user's documents may be directly moved around on the desk 36 by the user operating the writing tip end 30 or eraser end 28 of stylus 14 in the "touch and move" manner with respect to any region within bounds of the stamps 34 shown in FIG. 2d. That is, to reposition stamp 34 the user points with and places an end 28, 30 of the stylus on a position on the tablet surface which corresponds to a position on or enclosed within border 35 of the desired document stamp 34 as displayed in the desk view 32, drags the stylus end 28, 30 across the surface of the tablet 16 to the desired position on the tablet 16 which corresponds to the desired ending position in the desk view 32, and removes the stylus end 28, 30 from the tablet surface.

During the dragging of the stylus end 28, 30 across the tablet surface, the display unit 18 shows the stamp 34 of the desired document being moved from its initial position, through various intermediate positions, to the desired position on the system desk 36 in correspondence with the dragging of the stylus end 28, 30 across the surface of tablet 16. When the user lifts the end 28, 30 of stylus 14 off the surface of tablet 16, the user stops operation of the stylus in the "touch and move" manner and thus ends the ability to move the document stamp 34 on the system desk 36.

Preferably, the cursor 301 depicting a closed fisted hand is illuminated adjacent one side of the document stamp 34 by which the stamp appears to be moved as shown in FIG. 2d. The closed fisted hand cursor 301 and adjacent document stamp 34 move in the same pattern along the desk view as the writing tip end 30 or eraser end 28 moves along the tablet surface.

In addition to the various stamps 34 of documents, the desk view 32 provides indications of various depositories for documents, and various accessories which represent operations of processor 22 that the user can elect to perform from the user system desk 36 as described later. One depository is preferably labelled the "In-box" 63 and serves as a tray for receiving all new documents created by the user, any mail sent to the user by electronic mail, and any new items for the desk as requested by the user. The In-box is globally known and is interfaced to the pre-established electronic mail system, and thus available for mail purposes throughout a network of terminals to which system 20 belongs. Common addressing techniques are used.

When the In-box serves as a delivery spot for new items requested by the user, processor means provide icons of the requested items in the In-box 63. Thereafter, the user retrieves the items from the In-box by the touch and move operation of the stylus on one icon at a time held in the In-box. The retrieved icon is positioned on the system desk 36 as desired by the user again with the touch and move operation of the stylus 14.

One such item which can be obtained through the In-box delivery scheme is a folder 45. Other schemes for providing folders 45 in desk view 32 are also suitable. As shown in FIGS. 2a–2d, folders 45 may be used to hold stamps in a user desired order. Folders 45 are represented by a vertically (upper to lower) opening icon or in the alternative, by a horizontally (right to left) opening icon as shown in FIG. 2a. Operation of either representation is understood to be the same as the other and is described next.

Each folder icon 45 has a tab portion 46 for labelling and a main body portion 48 to which the tab portion is connected. Such a design mimics the familiar cardboard folder commonly used in various businesses. A touching and lifting of the stylus 14 on the tab portion 46 of folder 45 initiates a window process for labelling the folder. Upon such a touching and lifting of the stylus on tab portion 46, processor means displays a window 50 with a folder shaped writing area 42 on desk view 32 as illustrated in FIG. 2b. Within the initiated window 50, a pencil tip or eraser cursor is displayed when the user places the respective stylus end in proximity of the tablet at the tablet position corresponding to a position within the window area. A subsequent scribing motion of the writing tip end on the tablet position corresponding to the folder shaped writing area 42 generates the user desired label design in the user's handwriting. Similarly, by positioning a typing cursor 44, with the touch and move method of use of stylus 14, on the writing area 42 and thereafter typing in the writing area via keyboard 12 produces a typewritten label on folder 45. Further, a combination of typing through keyboard 12 and writing with stylus 14 to produce the label for folder 45 on the writing area 42 of the folder may be used.

Stylus markings or portions thereof may be erased by rubbing eraser end 28 of stylus 14 on the tablet position corresponding to the desired stylus markings or portions thereof in the window 50 of desk view 32. Newly typed portions on the folder label may be erased by keyboard means as in common typing processes. If folder 45 was previously labelled and is now being relabelled, the handwriting and typing of the previous label is shown on the folder shaped writing area 42 and may be erased in part or in whole by eraser end 28 of stylus 14 used in the erasure operation. A menu pick from a menu 40 associated with the window 50 enables erasure of all markings typed and handwritten, previously existing and newly generated. The second menu pick from the menu 40 enables termination of the window process initiated to label the folder 45 and returns the screen view 26 to the desk view 32 with the folder labelled or relabelled as desired.

The labelling window process is supported by a bit map whose bits are changed according to the typing, writing and erasing described above. The erase-all menu pick provides a blank bit map. The same bit map is used for a folder 45 from its first labelling through subsequent relabelling processes. In this manner, the previous label is shown during a subsequent labelling process and is changed by the changing of the bits (e.g. on, off) of the bit map.

A touch and lift of stylus 14 on the main body portion 48 of folder 45 selects the folder such that the folder is displayed in an open position and a stack of the stamps contained therein is exhibited on one side (i.e. right side or upper side) of the open folder as shown in FIG. 2c. The stamps in the exhibited stack are in an order established by the user from the last time the folder was in its open position. The stamp at the beginning of the stack is readily visible being front side up, and the succeeding stamps are illustrated to similarly be front side up but lying underneath the beginning stamp.

The stamps 34 may be moved from a front side up position on one side of the open folder (right side, or upper side) to a front side down position on the opposite side of the folder (left side, or lower side) by the touch and move operation of the stylus 14 on the stamps 34 in folder 45. FIG. 2d provides an illustration of the two sides of an open folder 45 holding the generated stack halves. Such manipulation of the stamps in the folder 45 allows the user to scan or page through the stack of stamps contained therein while maintaining the order of the stamps. This feature mimics the familiar actions used with actual papers which are to be kept in a desired order within a folder or the like.

In the alternative, stamps 34 may be shown front side up on each side of the open folder to enable user viewing of the stamps at the exposed ends of the stack halves of stamps in open folder 45.

Also illustrated in FIG. 2d, with the touch and move operation of stylus 14, other stamps 34 may be moved from the system desk 36 to a desired side of open folder 45 so as to add the stamp to the folder. The added stamp automatically assumes a respective front side up or front side down position depending on the side of the folder on which the stamp is placed. For the alternative case, the added stamp is shown in a front side up manner on the side of the folder on which the stamp was placed. To insure maintenance of the desired order of stamps in the stack, the user pages through the stack to the position at which a stamp is desired to be added by the above described method and then moves the desired stamp from the desk 36 to the top of a stack half on a side of open folder 45.

Preferably, the processor 22 detects intersection of a stamp being moved over a folder half and in response displays the stamp automatically positioned on top of the stack on the intersected folder half.

Stamps 34 may be similarly removed from the open folder 45 with the touch and move operation of the stylus 14. In order to remove a stamp from open folder 45, the stamp must be at the exposed end or top of a stack half on either side of the folder 45. This is accomplished by the user paging through the stack of stamps and stopping with the stamp desired to be removed on top of a stack half. Thereafter the stamp may be moved from the top of the stack half to a position on the system desk 36. The stamp 34 removed from open folder 45 assumes a front side up position on the desk 36 to enable individual display of the stamp in desk view 32.

Stamps which have been stapled together by staple means 52 on system desk 36 act as a single stamp which may be inserted and subsequently removed from folder 45 in the same manner as described above for single stamps 34.

Also with the folder 45 in an open position, the stamp at the exposed end or top of a stack half on either side of the folder may be selected for full screen display with the touch and lift operation of the stylus on the stamp. Such operation provides a full screen view of the document corresponding to the selected stamp and initiates annotation processing of the document as disclosed in a related U.S. patent application Ser. No. 200,091, now abandoned for "Document Annotation and Manipulation in a Data Processing System" assigned to the assignee of the present invention. Upon return from the annotation processing, processor 22 displays the desk view 32 with the stamp of the viewed and/or annotated document in the open folder 45 in the stack position (i.e. top of the stack half) from which the stamp was initially selected on the system desk 36. The stamp is displayed bearing any annotations made to the corresponding document during the annotation processing from which the screen (desk) view is being returned.

Open folder 45 is closed by a touch and lift of stylus 14 on the tablet position corresponding to the tab portion 46 of the folder 45. Upon closing a folder, the two stack halves are combined to form a single stack with the stamps in the order established by the user while the folder was open. When the folder 45 is reopened, the single formed stack is exhibited on one side of the open folder with a beginning stamp (i.e. the stamp on the top of the stack) visible as described previously.

Folder 45, opened or closed, is repositioned on the system desk 36 in desk view 32 by the touch and move operation of stylus 14 on the remaining main body portion (i.e. not tab or stamp covered portions) of folder 45. The folder together with its contents is moved as one entity in a pattern corresponding to the motion of stylus 14 on tablet 16. Such a repositioning technique is useful for reorganizing folders 45 on system desk 36 in a natural manner.

Repositioning of open folder 45 is preferably limited to areas of desk 36 which are not occupied by an icon of another desk item. To that end, open folders can not be stacked on top of an icon of another item, and icons of other non-stamp items cannot be stacked on top of or in an open folder. When either of such stacking is attempted, processor 22 automatically separates the involved icons. One exception to this stacking limitation is the stacking of open folders 45 on each other which is accomplished by repeated touch and move operation of stylus on desired open folders 45.

In its closed position, folder 45 has other stacking characteristics. A multiplicity of closed folders may be stacked one on top of the other by a repeated touch and move operation of the stylus 14 on desired closed folders. This feature allows the user to organize his desk as desired. The unique user generated labels on the closed folders enable the user to quickly recognize a folder with a first glance whether the folder is stacked or individually standing.

Closed folder 45 cannot be placed on top of certain other desk items such as a stapler 52, staple remover 54 or icon indicating a processor application. If a user moves a closed folder icon to cover the icon of one of these desk items, processor 22 automatically provides the desk view with the folder 45 underneath the icon of the desk item. Similarly, stamps 35 are not allowed to remain positioned over a folder. Upon a user placing a stamp on closed folder 45, processor 22 automatically positions stamp 34 under folder 45. A succeeding stamp or stamps positioned on folder 45 follow and are processor positioned immediately under folder icon 45. As a result, a stack of stamps may form under closed folder 45 and is accessible only after the folder is removed.

Trays 60 are provided on the system desk 36 to hold user desired stamps 34 and/or closed folders 45 as shown in FIG. 2a. The trays 60 provide a further organizational tool for the user and provides an additional designated area for holding closed folders and/or stamps as desired. In order to place a closed folder 45 in a tray 60, the user operates the stylus 14 in the touch and move mode relative to the closed folder icon 45. The user moves the folder icon on top of the tray icon 60 which mimics the motions of a business person inserting a file folder into a tray on a desk. Preferably, the stacking of stamps 34 and/or closed folders 45 in a tray does not follow the above described characteristics. Instead, the tray 60 allows the user to stack stamps 34 and closed folders in a first in-last out order in the tray 60. The items in the tray 60 are subsequently retrievable by the touch and move operation of the stylus on the item icon on top of the stack in the tray. Removal of the item icon on top of the stack in the tray exposes a succeeding item icon. Once exposed, that item icon is considered to be the top of the stack of item icons in the tray and is in a similar fashion, at that point, retrievable.

In an alternative embodiment, there exists a hierarchy for stacking desk items in a tray. The hierarchy provides that icons of desk applications (e.g. mail box, stapler, printer, etc.) automatically be displayed on top in the tray. Folders are second to icons of desk applications, and stamps are last so that they appear on the bottom of any pile of items in a tray. For each catagory (desk applications, folder, stamps), the most recent icon of that catagory placed in the tray is shown on top of the other icons of items in that catagory in the tray.

A tray 60, containing items or empty, is repositionable on desk 36 using a touch and move operation of the stylus on portions of the tray which are not covered by folders 45 or stamps 34. Such repositioning of the tray is illustrated by the tray with its contents being moved in a pattern corresponding to the movement of the stylus end on the tablet 16. Thus, the tray 60 and all its contents are moved all together as expected with a common tray.

A closed folder 45 may be "thrown away" by operations of a trash barrel icon 74 shown in FIG. 2a. Disposal of a closed folder and the stamps contained therein is performed by placing a corresponding closed folder icon 45 on the illustrated trash barrel 74 using the touch and move operation of stylus 14 on the desired icon 45. Upon the user leaving the folder 45 on the trash barrel icon 74, the processor stores the folder 45 and associated contents accordingly. In an alternative embodiment, only empty folders may be disposed of through the trash barrel icon 74 with the empty folder in its closed position.

A subsequent positioning of the stylus end over the lid 84 of trash barrel icon 74 causes the lid 84 to be highlighted to indicate to the user that an item has been disposed in the trash barrel. Removal of a disposed item is by the user touching a stylus end 28, 30 on a tablet position corresponding to lid 84 of trash barrel 74 and moving the stylus end 28, 30 in contact with the tablet surface to a position which corresponds to an area outside of trash barrel 74. The last item to have been placed in the trash barrel 74 is the first item to be retrieved by the foregoing method. Other ordering of items for retrieval may be used depending on the data structure employed to implement the trash barrel 74 which is, in general, a disk storage area. The retrieved folder 45 holds the associated contents in the order at the time the folder and contents were deposited in the trash barrel. Alternatively, the folder 45 may be retrieved without contents and the contents are unretrievable from the trash barrel.

Software Details

Figure 3:
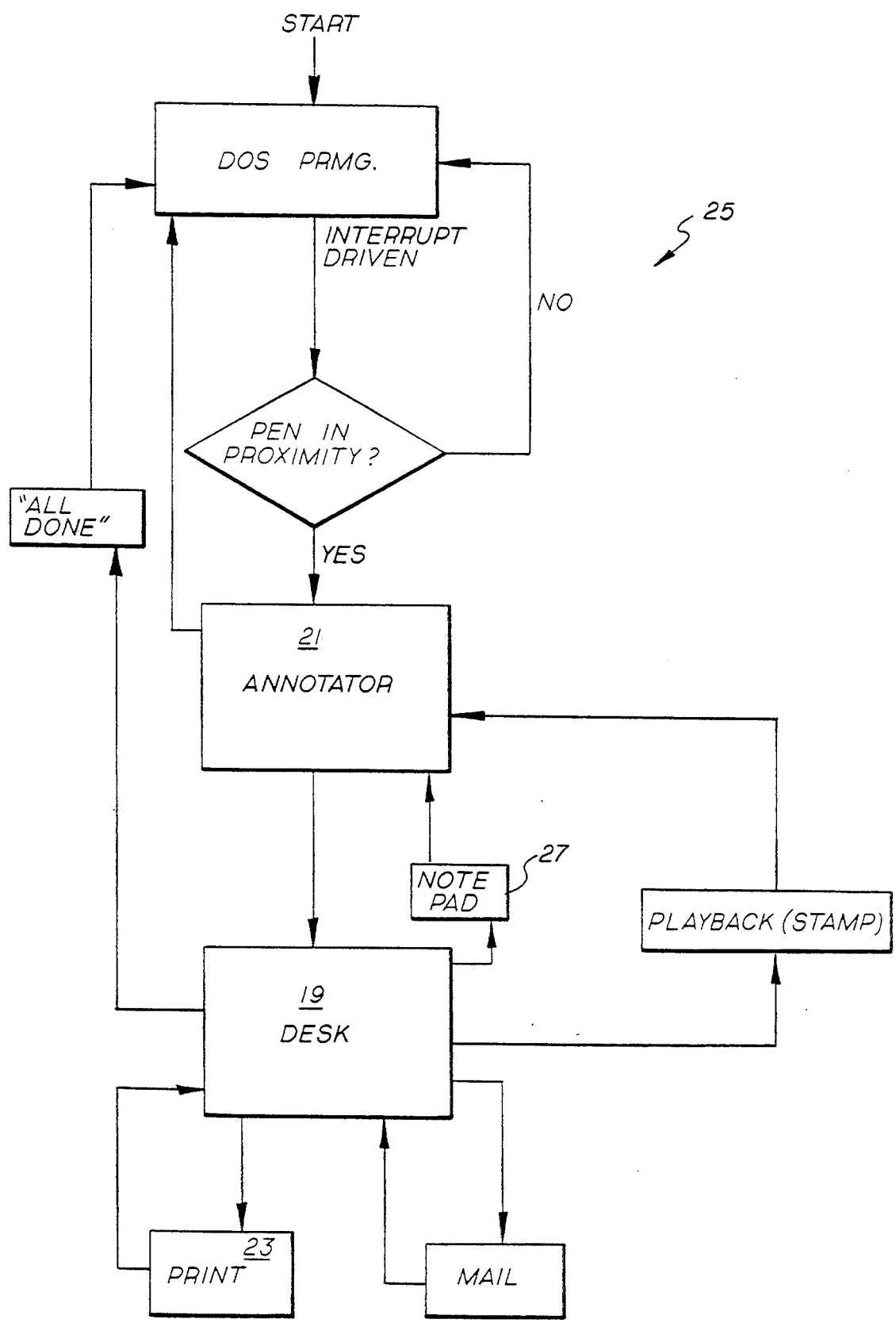
FIG. 3 is a block diagram of the various applications performed by the system of FIG. 1.

The end user features of folders 45 in the desk view of system 20 (FIG. 1) are provided by an Annotator-Desk task program 25 described in the parent application and repeated here with reference to FIGS. 3-6. The desk view 32 and functions corresponding therewith are driven by a desk application routine 19 which is one of several application routines in the Annotator-Desk task program 25. Other application routines are for driving the annotator 21, or a printer 23, etc. The relationship of the desk view 32 to other applications (e.g. note pad, printer, mail, All Done, Annotator) is illustrated in FIG. 3.

An Applications Dispatcher (not shown) oversees all applications of the Annotator-Desk task. The Applications Dispatcher uses a set of codes agreed upon by all applications to determine which application routine is to be executed. The code for requesting the desk application routine 19 is preferably initiated from within the Annotator application 21. In other embodiments, the Applications Dispatcher may be initialized with the code for the desk application routine 19. Subsequent to receipt of the code for the desk application routine 19 and after execution of the last requested application routine, the Applications Dispatcher enables execution of the desk application routine 19.

The desk application routine 19 is formed of two subroutine tasks, the supervisor task 15 (FIG. 5) and tablet state diagram task 17 (FIG. 6) described later. The supervisor task 15 and tablet task 17 share and manipulate a desk database which holds the information that keeps track of the items currently on the user's system desk 36 including items in the trash barrel 74.

Figure 4A:
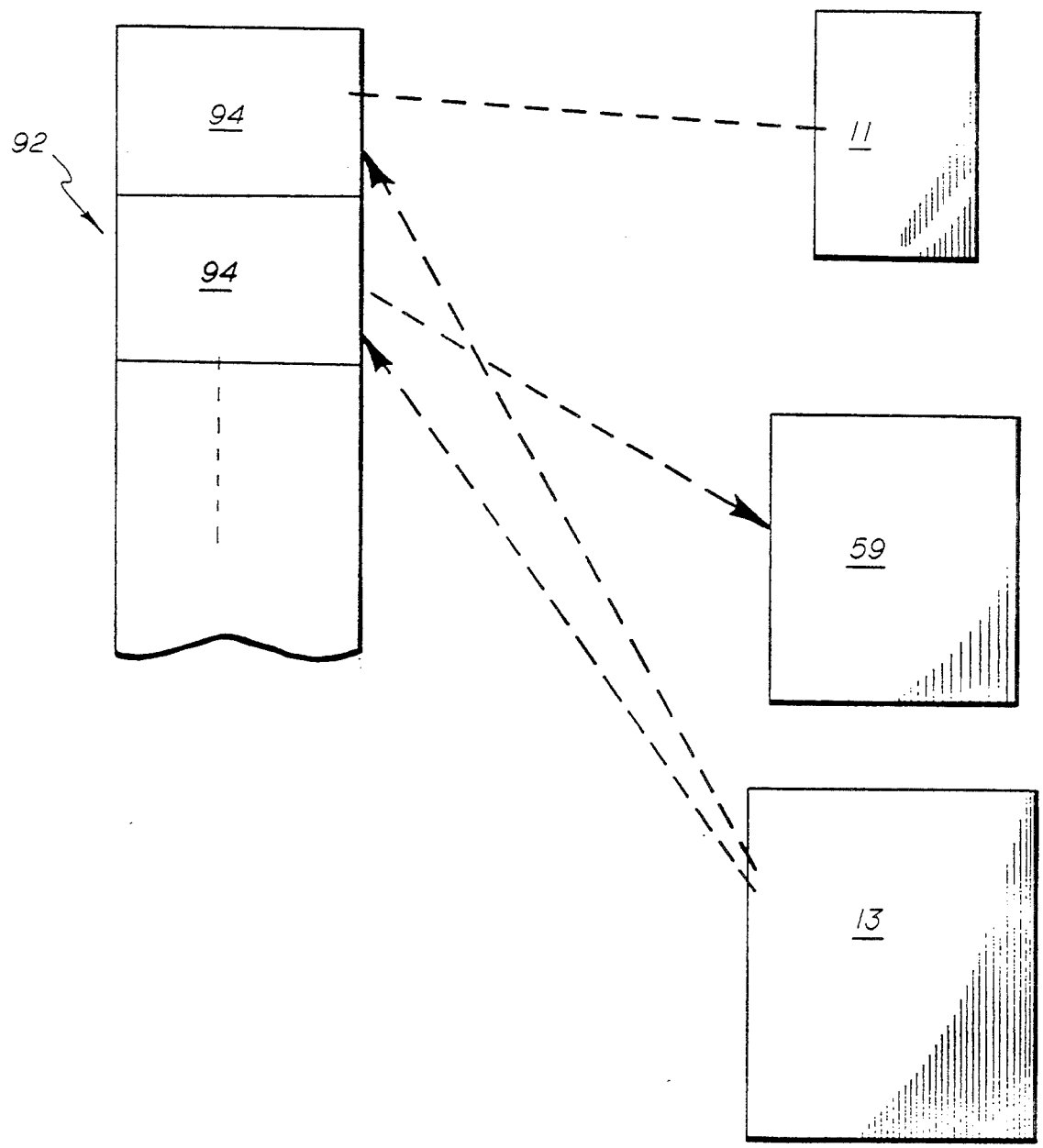
FIGS. 4a–4b are block diagrams of the database used in the desk view of FIGS. 2a–2d.

Specifically as illustrated in FIG. 4a, the desk database comprises a doubly-linked list 92 for indicating attributes of each item in the desk view 32, a file 11 of stamp images, an icon file 59 containing the various icons used to represent the other desk items, and a file 13 in which the bitmap of the current desk view 32 is stored. Each entry 94 in doubly-linked list 92 describes an item in the desk view 32.

Figure 4B:
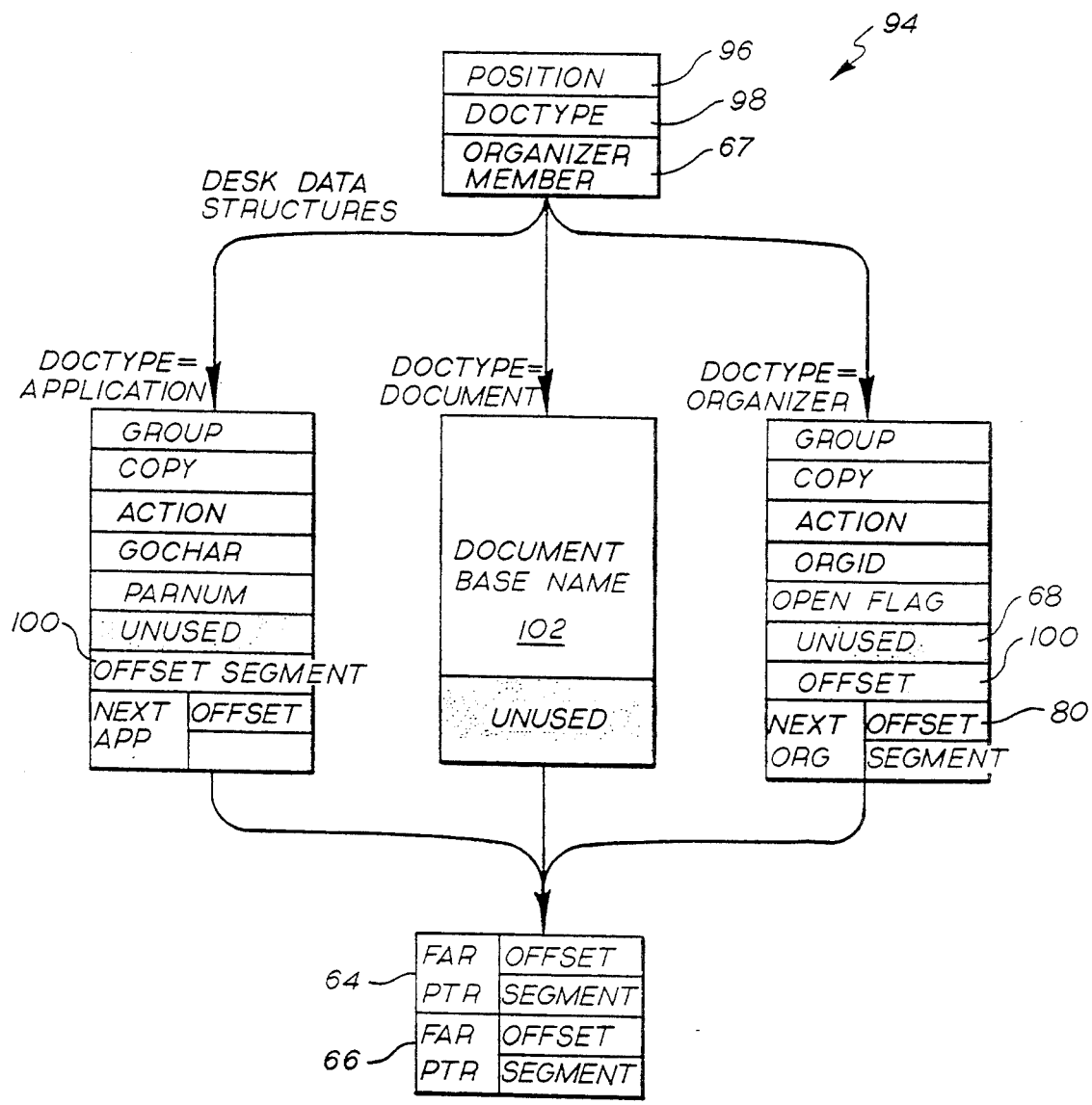

In particular as shown in FIG. 4b, each entry 94 specifies in respective fields 96, 98 the position of the item in the desk view 32, and whether the item is a document stamp, In-box or other tray icon, icon of a folder, or a desk accessory icon. Also a placement field 67 specifies whether the item is currently positioned in a tray, folder or other holding device. If the item is a stamp, the type field 98 also indicates whether the stamp is on top of or in a stack, or not included in any stack.

Also depending on the type of item indicated in type field 98, the processor 22 attributes certain predefined characteristics to the item such as the class of moveable icon (desk tool, applications activated with a stamp, applications activated without a stamp) as designated in allocated fields. To that end, if a folder 45 is indicated in type field 98, then the processor 22 does not allow the folder to remain on top of icons of desk tools such as the stapler and staple remover. Preferably the processor 22 displays the desk tool icon automatically repositioned on top of the folder 45 after a user has placed the folder on the desk tool icon.

The file location of the reduced image or graphical icon of the item is specified in a respective field 100 (or 102 in the case of a stamp) of entry 94 by an address or other indication of the associated position in the stamp file 11 or icon file 59. File location of a second graphical icon of the item, for example an open folder as opposed to a closed folder, is specified in a respective field 80. Further, in the case of a document stamp, a table of contents (called a superfile) listing all files, such as voice annotation files, visual annotation files and image files, of the corresponding document is locatable by the name provided in the name field 102.

In the case of a folder 45 indicated in type field 98, a field 68 indicates a data file 70 which represents the ordered contents of folder 45. Two implementations of the data file 70 are provided in FIGS. 4c and 4d. Other implementations are understood to be suitable.

Figure 4C:
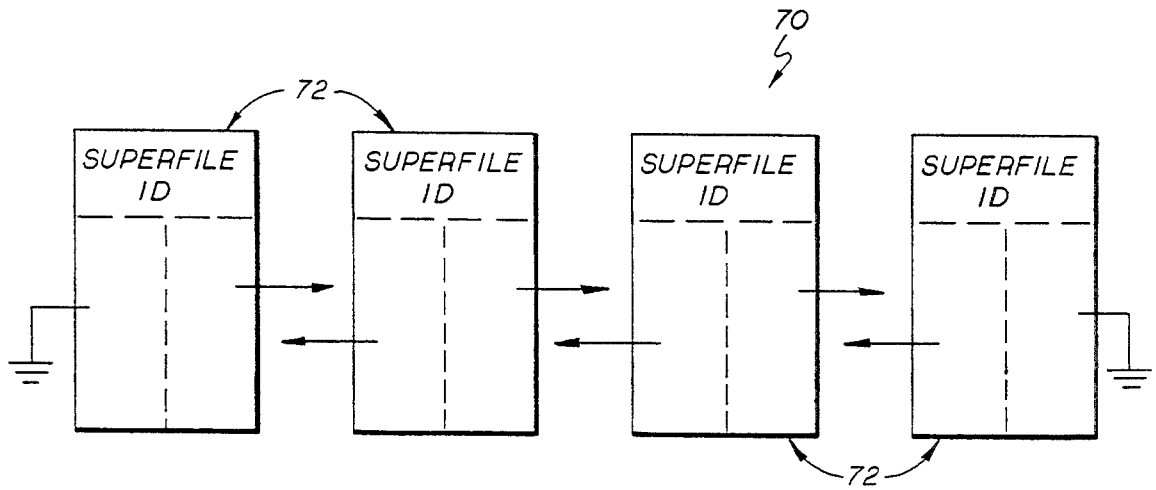

In FIG. 4c, data file 70 of a folder 45 is implemented by a series of changeable double linked files 72. Specifically each file 72 provides a pointer to the preceeding file and a pointer to the succeeding file in the series. Each file 72 also specifies the superfile of a document whose corresponding stamp is held in folder 45. The files 72 are linked in the order in which respective document stamps 34 are held or stacked in folder 45. The pointers are changed by known methods to provide addition or removal of a file to effect addition or removal of a stamp 34 from folder 45.

Figure 4D:
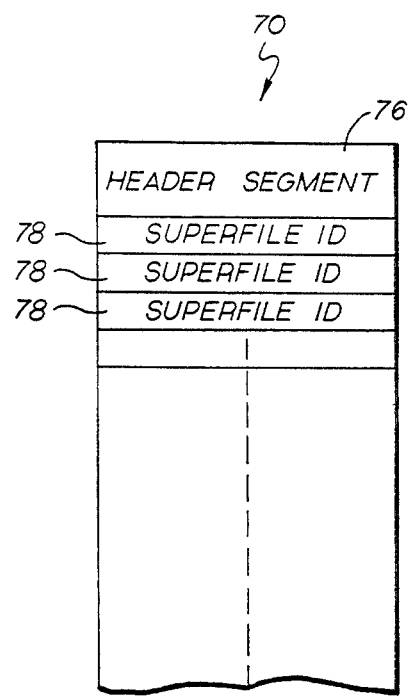

In FIG. 4d, datafile 70 of a folder 45 is implemented by an open ended file. Each entry 78 in file 70 indicates the superfile of a document whose corresponding stamp is held in folder 45. Starting from a header segment 76, the entries 78 are in the order in which respective document stamps are held or stacked in folder 45. To effect addition or removal of a stamp 34 from folder 45, a corresponding entry 78 is added or removed in the pertinent position of file 70 with succeeding entries position adjusted accordingly.

The entries 94 in doubly-linked list 42 are changeably linked in order of most recently used item at the top of the list 92 to least recently used item at the bottom of the list 92. Each entry 94 has a first pointer 64 (FIG. 4b) to the preceeding entry 94 and a second pointer 66 (FIG. 4b) to the succeeding entry 94, both pointers of which are used in ordering and reordering entries 94.

Figure 5:
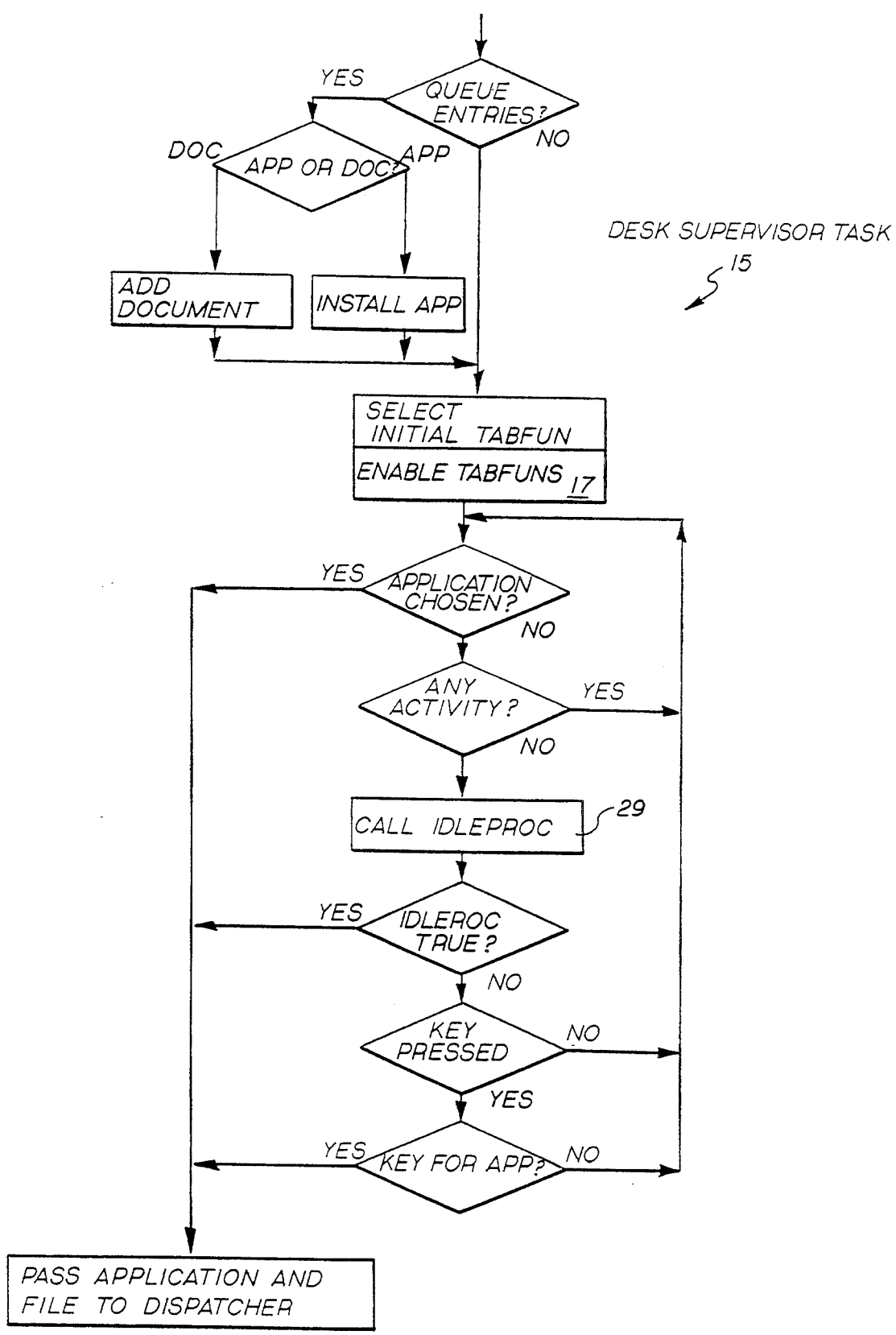
FIG. 5 is a flow chart of a supervisor task for implementing operation of the desk application of the system of FIG. 1.
Figure 6:
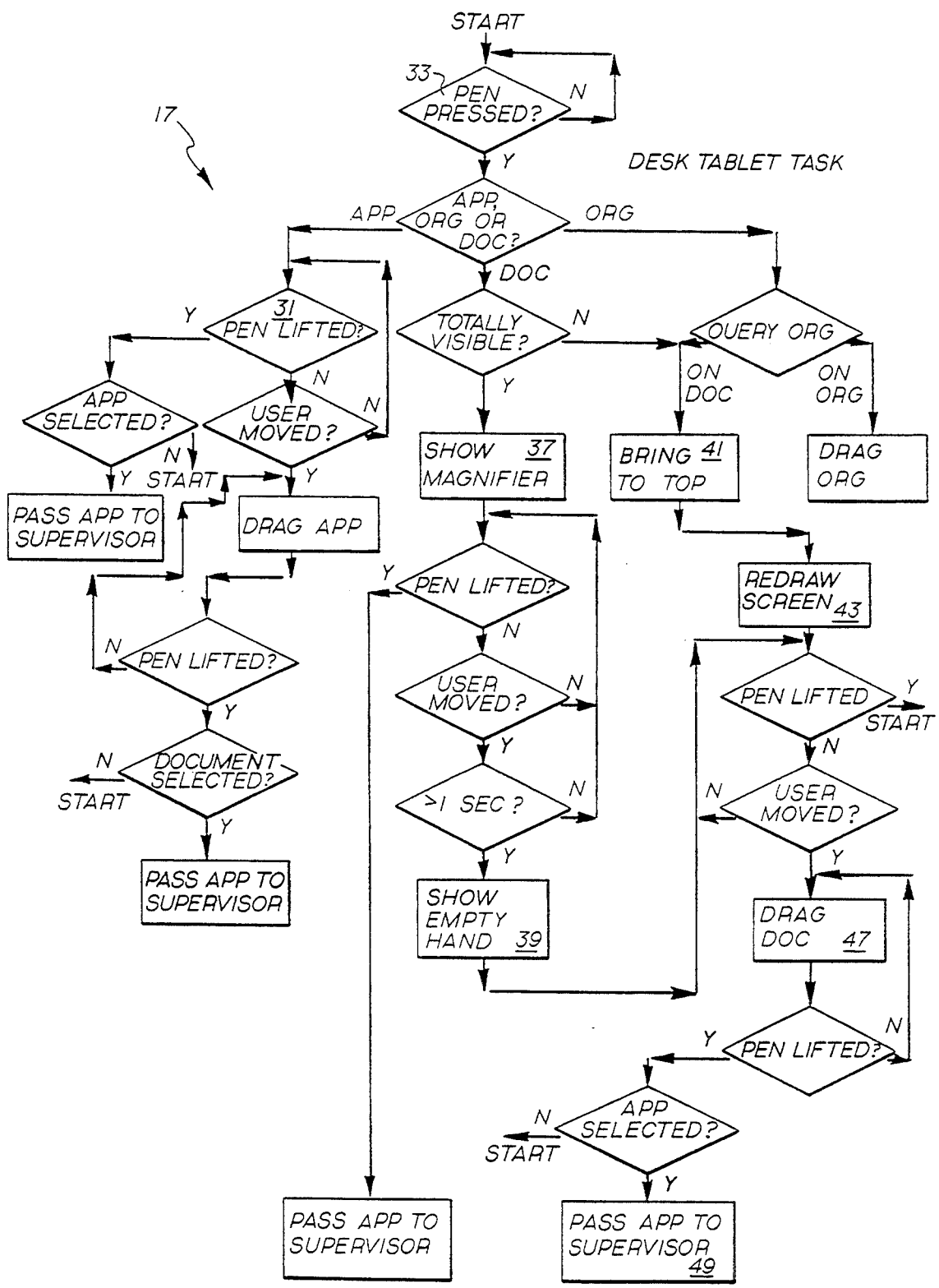
FIG. 6 is a flow chart of a tablet task for implementing the desk view of FIGS. 2a–2d.

Now making reference to FIG. 5 and the operation of the supervisor task 15 of the desk application 19 (FIG. 3), the basic purpose of the supervisor task 15 is to maintain the display of desk view 32. When the Applications Dispatcher gives control to the supervisor task 15, the supervisor task first determines if new documents and/or accessories and hence new stamps or icons need to be added to the system desk 36. If so, the current bit map image 13 (FIG. 4a) of the desk view 32 is updated and new entries in the desk list 92 for the new items are made accordingly. Once an updated display of the desk view 32 is provided on display unit 18, the supervisor task 15 adds to the In Box 63 of the user's system desk 36 the stamps 34 and/or icons of the newly received files from the annotator application 21 and/or note pad application 27 (FIG. 3), and enables the tablet task 17 (FIG. 6). Thereafter, the supervisor task 15 monitors the keyboard 12 (FIG. 1) for entry of requests for desired applications and monitors the tablet task 17 for activity. If there is no activity from either the keyboard 12 or the tablet 16 via tablet task 17 then the supervisor 15 checks for incoming mail and performs other procedures at 29 in FIG. 5. If there is incoming mail or other user desired tasks to be performed (such as satisfying an order/request for a new item from the system catalogue of desk items), the supervisor task 15 passes the necessary files and control to the Applications Dispatcher. Upon return, the supervisor task 15 begins anew and puts the new mail and/or new items in the In Box 63 (or proper tray in the case of some mail) and continues to monitor the keyboard 12 and tablet task 17.

When the tablet task 17 or signals from keyboard 12 indicate that the user has selected an accessory (such as a folder 45) or processor operation other than a desk tool, the supervisor task 15 disables the tablet task 17 and passes to the Applications Dispatcher an identifier of the selected processor operation and the file of any document on which the processor operation is to operate. Thereafter the Application Dispatcher processes the requested processor operation.

The tablet task 17 (FIG. 6) follows the user's activity with the stylus 14 relative to tablet 16. The tablet task 17 is responsible for determining which icon or stamp was selected, redrawing the necessary parts of the desk view 32 (e.g. replacing a closed folder icon with an open folder icon), displaying an icon or stamp being moved, relocating the icon or stamp, and passing a selected non-desk tool processor operation (such as mail, printer and trash barrel applications) to the supervisor task 15. The tablet task 17 also determines which method of use of the stylus 14 the user is currently using.

The flow chart of FIG. 6 illustrates operation of tablet task 17. When a user places an end 28, 30 of the stylus 14 on tablet 16 within sensing range of tablet 16, the tablet task 17 displays an empty handed cursor to represent the present activity of the stylus 14. When the user positions the stylus end 28, 30 on the tablet position corresponding to a stamp 34 or icon in desk view 32, the tablet task 17 tests at 33 in FIG. 6 the pressure exerted on the active end of the stylus 14 to determine whether the user is intending to invoke a certain operation of the stylus 14 relative to the stamp 34 or icon. If the pressure exerted exceeds a predefined threshold then the tablet task 17 determines on which stamp 34 or on which type of icon (i.e. application or holding member such as a tray or folder) the stylus 14 is acting. This is accomplished by the tablet task 17 starting at the beginning of the linked list 92 (FIGS. 4a–4b) and checking each entry 94 to see if the current cursor position is within the bounds stated in the position field 96 of the entry. The first entry found to have the current cursor position within the bounds of the position field 96 is selected.

In the case of a stamp 34 being detected as the subject, the tablet task 17 then determines which method of use of the stylus 14 is being used by testing for an intersection of the boundary of the entry 94 with boundaries of all prior entries. If there are no intersections, the subject stamp 34 is determined to be fully visible (i.e. not within a stack but possibly on top of a stack) and the cursor is changed to a magnifying glass at 37 in FIG. 6 indicating that the associated document will be displayed if the user lifts his/her hand within the next second. Such displaying is handled by the annotation application routine which is called by the supervisor task 15 after the supervisor task 15 receives control from the tablet task 17. If the user does not lift his/her hand within that second, then the cursor is changed to an empty hand at 39 in FIG. 6.

If there are any intersections between the entry's boundary with that of any previous entries 94 in list 92, then the stamp 34 is under other stamps 34 or icons and may be automatically made visible at 41 in FIG. 6 (i.e. brought to the top of the stack in which it lies) by the processor 22. In the case of a holding member (e.g. tray or folder) being the detected intersecting subject, if the stylus end is determined to be positioned on a stamp inside the holding member then no action is taken. In an alternative embodiment, the stamp in a tray is made totally visible (i.e. is brought to the top of the stack in the tray). Otherwise the holding member (tray or folder) is moved in accordance with user movement of the stylus 14.

A commonly known hidden surface algorithm is used to determine which parts of the stamp and/or icon are currently visible, and hence what area of the desk view 32 must be redrawn. The desk view 32 is preferably redrawn at 43 in FIG. 6 by iterative clipping but other methods are suitable. The hidden surface algorithm is then used to determine which portions of the stamps/icons of the entries below the selected entry 94 must be drawn. After this determination the selected entry 94 is removed from the linked list 92.

At this point after either the redrawing at 43 of desk 32 or the changing of the cursor from a magnifying glass to an open hand at 39, if the user lifts the stylus 14 from tablet 16, then the tablet task 17 is ended. In the case of having redrawn desk view 32, tablet task 17 is ended after the selected entry 94 is added to the beginning of the linked list 92. If the user, without lifting the stylus 14, moves the stylus end 28, 30 along the tablet surface, the tablet task 17 displays a grasping hand cursor and moves the image of the stamp at 47 in FIG. 6, but does not yet update the linked list 92. If the user subsequently releases the stamp on top of a processor operation icon of the activated-with-document type, the tablet task 17 at 49 passes to the supervisor task 15 the necessary information of the stamp and selected processor operation to have that processor operation performed. Thereafter, the application routine which performs the proper operation replaces the stamp to its original location in desk view 32, but on top of any stack at that location.

If the user releases the stamp on top of other stamps or non-processor operation icons (e.g. a folder, open or closed), the new location is noted in the position field 96 of the associated entry 94 for the stamp in linked list 92. If the new position of the stamp relative to the other stamps/icons is within predefined alignment limits, then a routine for snapping the stamps/icons to each other is performed. Any new aligned stack which results changes the type field 98 of the associated entry 94. Further, the entry 94 corresponding to the newly positioned stamp/icon is made to be first in the linked list 92. It is noted that since there is no single operation to insert a stamp into a stack, the linked list 92 is not only ordered by last accessed but also by stack depth. That is, if the boundaries of the stamps/icons intersect, their order in the linked list 92 determines which is "on top of" the other.

If the detected subject under the stylus cursor is an icon of a desk accessory or processor operation then it is determined at 31 in FIG. 6 whether the user is operating the stylus in the "touch and lift" manner to select the processor operation (including a folder labelling process) or in the "touch and move" manner to reposition the icon. In the former situation, after the lifting of the stylus is detected, the tablet task 17 determines whether the subject icon represents a processor operation which is selectable without a stamp. If so, then the tablet task 17 passes the necessary information and control to the supervisor task 15, for example to begin the window labelling process or to open or close a folder 45 depending on whether the tab portion 46 or main body portion 48 of the folder icon was acted upon. Otherwise the tablet task is ended and started anew with the detection of sufficient pressure on the stylus end.

If the stylus is being operated in the touch and move mode with respect to the subject processor operation icon, then tablet task 17 provides for the display of the icon moving in correspondence to user movement of the stylus. Thereafter if the stylus is lifted such that the subject icon is placed on a stamp then the tablet task 17 determines if the subject icon represents a processor operation which is activated with a stamp (the stamp being underneath the subject icon). If so, then the tablet task 17 passes to the supervisor task 15 control and necessary information for processing the process operation corresponding to the chosen icon and stamp. The application routine subsequently called by the supervisor task 15 replaces the icon to its original location in desk view 32.

The foregoing moving of a stamp or icon during any part of the tablet task 17 is accomplished by known methods which display the whole object in motion from an initial position through intermediate positions to a final position which are dictated by user operation of the stylus. Also such movement is exhibited in a one to one correspondence with user operation of the stylus which in turn provides a direct and natural sense of manipulation of the items on the system desk 36.

Equivalents

While the invention has been particularly shown and described with reference to a preferred embodiment thereof, it will be understood by those skilled in the art that various changes in form and details may be made therein without departing from the spirit and scope of the invention as defined by the appended claims. For example, though the preferred implementation utilizes a stylus for input and control, the system desk has application to systems which are solely keyboard controlled and to systems which utilize a mouse for input. Also, the system desk may cooperate with application software other than the annotator. For example, the desk may serve as a filing system for conventional word processing and spreadsheet software.

We claim:

1. In a data processing system having a video display for displaying a screen view with images of sheets of information and icons of desk accessories, a graphical icon in the screen view comprising:

a tab area;

a first main body portion generally rectangular in shape with the tab area positioned adjacent one side of the rectangular shape so as to form a representation of a folder for holding images of desired sheets of information in a user established order, the representation being changeable between a graphical representation of a closed folder in which only said first main body portion and said tab area are displayed and a graphical representation of an open folder in which a second main body portion generally rectangular in shape disposed adjacent said first main body portion is also displayed upon user activation of one of the main body and the tab area, each of the first and second body portions of an open folder capable of holding a stack of representations of user selected sheets of information one on top of the other in user established order, the representation of a sheet on top of the stack held on either body portion being moveable to a top of the stack held on the other body portion such that the ordering of the sheets is maintained and the sheets in one stack are viewable one at a time, the representation of a sheet being visually identifiable on the top of at least one of the stacks said tab area connected to one body portion for changing, upon user request, the screen view from displaying the graphical representation of the open folder to displaying the graphical representation of the closed folder.

2. A graphical icon as claimed in claim 1 wherein user request for changing the screen view to display the closed folder representation is through an electronic stylus briefly contacting a position on a working surface corresponding to position of the tab area in the screen view.

3. A data processing system comprising:

a video display displaying a screen view having representations of sheets of information and at least one changeable representation of a folder for holding representations of user selected sheets of information one on top of the other in user established order, tile changeable representation of the folder being changeable between a graphical representation of a closed folder and a graphical representation of an open folder with its contents viewable, the graphical representation of the open folder comprising two body portions positioned adjacent each other, each for holding a stack of representations of user selected sheets of information one on top of the other in user established order, the representation of a sheet on top of the stack held on either body portion being moveable to a top of the stack held on the other body portion such that the ordering of the sheets is maintained and the sheets in one stack are viewable one at a time, the representation of a sheet being visually identifiable on the top of at least one of the stacks; and a tab member connected to one body portion for changing the screen view upon user request frown displaying the graphical representation of an open folder to displaying a graphical representation of a closed folder;

a processor coupled to the video display changing the changeable representation of the folder between the graphical representation of a closed folder and the graphical representation of an open folder upon user request; and at least one input device connected to the processor for enabling a user to make requests to the processor to change the screen view displayed by the video display.

4. A data processing system as claimed in claim 3 wherein the graphical representation of an open folder initially displayed upon a change from the graphical representation of a closed folder includes representations of the user selected sheets of information in order in one master stack on one half section, the other half section being empty but able to hold representations of sheets of information moved from atop the master stack thereto.

5. A data processing system as claimed in claim 3 wherein the representation of a sheet is visually identifiable on the top of either stack held on either half section.

6. A data processing system as claimed in claim 3 wherein the representation of a sheet on top of a stack is user moveable from inside the open folder to a desired position outside the folder such that the representation of the sheet is removed from the folder.

7. A data processing system as claimed in claim 6 wherein the sheet representation is user moveable through a stylus input device operating on a working surface beginning at a position corresponding to position of the sheet representation in the screen view and ending at a position corresponding to the desired screen view position outside the folder.

8. A data processing system as claimed in claim 3 wherein a representation of a sheet lying outside the open folder is user repositionable to the top of a stack in the open folder to insert the sheet representation into the folder.

9. A data processing system as claimed in claim 8 wherein the sheet representation is user repositionable through a stylus input device operating on a working surface beginning at a position corresponding to the sheet representation outside the open folder in the screen view and ending at a position corresponding to the screen view position of the top of a stack in the folder.

10. A data processing system as claimed in claim 3 wherein:

the input device includes a stylus; and the tab member is activated to change the screen view to display the closed folder representation by the user briefly touching the stylus on a position on a working surface that corresponds to screen view position of the tab member.

11. In a data processing system having a video display for displaying a screen view with images of sheets of information and icons of desk accessories, a method of organizing desired sheets of information comprising the steps of:

providing a graphical icon of a folder in the screen view, the folder icon being changeable between a representation of an open folder and a representation of a closed folder, wherein the open folder representation includes a stack of images of desired sheets on one side of the open folder, the images being in user established order in the stack;

displaying the folder icon in the screen view in its open folder representation; and:

moving images of sheets of information relative to the open folder representation by, moving one image at a time from a top of the stack to an opposite side of the open folder to page through the stack of images, the images placed on the opposite side of the folder forming a stack half, and stopping with a certain image on top of the stack on the one side to form a collection of images of desired sheets of information one on top of the other in user established order on the open folder representation, the collection being viewable from the open folder representation.

12. A method as claimed in claim 11 further comprising the step of removing the certain image from the stack to change the collection of images in the open folder.

13. A method as claimed in claim 11 further comprising the step of placing an image on the certain image to add an image to the open folder.

14. In a data processing system with a video display, a method of selectively displaying an image of an open file folder and an image of a closed file folder comprising:
   a. storing art image of a closed file folder, said image including at least a first rectangular body portion;
   b. storing an image of an open file folder, said image including at least first and second rectangular body portions positioned adjacent each other;
   c. displaying one of said images;
   d. providing an input to said system;
   e. in response to said input displaying the other of said images;
   f. displaying at least one stamp of a sheet of information which is contained within said file folder, said file folder containing a plurality of stamps, by steps comprising
      i. storing a reduced image of said sheet of information as said stamp, said reduced image containing recognizable and distinguishable details of said sheet of information, said reduced image of said sheet of information thus being unique; and
      ii. displaying said stamp on top of one of said body portions when said image of an open file is displayed;
   g. moving said sheet of information on said screen with respect to said file folder; and
   h. providing said stamps one on top of the other in a stack within said folder and displaying said stamps in succession as the top stamp is successively removed from said stack.

15. The method according to claim 14 wherein said step of providing an input comprises pointing to said file and providing an input while pointing to said file.

16. The method according to claim 15 wherein said step of pointing comprises generating a cursor and positioning said cursor over said image of said folder.

17. The method according to claim 16 wherein said step of positioning said cursor comprises positioning said cursor using a stylus and pad; and wherein said step of generating said input comprises lifting said stylus from said pad while said cursor is on said folder image.

18. The method according to claim 15, and further including a tab portion adjacent to said first body portion and further including the steps of:
   taking a first action while providing an input when pointing to said tab portion; and
   taking a second action while providing an input when pointing to said first body portion of said folder.

19. The method according to claim 18, wherein pointing to said tab portion and providing said input when said folder is closed enables writing on the first rectangular body portion of said folder.

20. The method according to claim 19, wherein said step of pointing comprises generating a cursor and positioning said cursor utilizing a stylus and pad.

21. The method according to claim 20, wherein said step of writing comprises writing on said folder with a stylus.

22. The method according to claim 20, wherein said system includes a keyboard and wherein said step of writing comprises typing on said folder with said keyboard.

23. In a data processing system including a video display, a method of providing a screen desk view including the display of icon type items and stamp type items, said icon type items including at least a folder icon and said stamp type items comprising at least one reduced image of a sheet of information, said reduced image containing recognizable and distinguishable details of said sheet of information, said reduced image of said sheet of information thus being unique, comprising:
   a. providing a stamp file containing reduced images for each stamp type item to be displayed;
   b. providing an icon file containing at least an image of an open file folder and an image of a closed file folder;
   c. providing a data base for all items currently displayed on the screen desk view, the data base having an entry for each item, said entry describing said item and including:
      i. the location of said item on the screen;
      ii. the type of item; and
      iii. in the case of the folder icon, the location of the image of the one of the open and closed folder images not being displayed, and the location of a data file for the folder contents;
   d. providing for each folder displayed a folder data file containing an entry for each stamp contained in the folder, said entries contained in said file in the same order that said stamps are in said folder, one on top of the other;
   e. displaying said desk view including at least one folder with said folder closed;
   f. in response to an input displaying an open folder using the location of said open folder image stored in the data entry for said closed folder to access the image of said open folder;
   g. displaying the stamps in said open folder with the stamp at the top of said folder visible;
   h. manipulating and rearranging said stamps in said folder on said screen;
   i. reordering said folder file as said stamps are rearranged; and
   j. displaying a closed file by responding to an input using the location of said closed file stored in the entry of said data base for said open file to access the image of said closed file.

24. The method according to claim 23, wherein said system includes a pointing device and further including:
   a. generating a cursor;
   b. moving said cursor with said pointing device, said pointing device also being capable of providing an input to said system; and
   c. carrying out said steps of providing inputs to change between open and closed folders by placing said cursor on said folder using said pointing device and then providing said input and carrying out the step of manipulating said stamps through the use of said pointing device and cursor.

25. The method according to claim 24, wherein said pointing device comprises a stylus and surface representative of said screen view and wherein the provision of each of said inputs comprises lifting said stylus from said surface.

26. The method according to claim 23 and further including a superfile associated with each of said stamps containing therein at least a full size image of the sheet of information contained in the reduced image of said stamp, the location of said superfile also being contained in said data entry in said data base and further including the step of providing, in response to the selection of a stamp and the provision of an input while the cursor is located on said stamp, the display of a full screen image of the sheet of information contained in said stamp.

27. The method according to claim 23, wherein said folder data file is implemented by an open-ended file.

28. In a data processing system including a video display, a method of providing a screen desk view including the display of icon type items and stamp type items, said icon type items including at least a folder icon and said stamp type items comprising at least one miniaturized image of a sheet of information, comprising:
   a. providing a stamp file containing stamp images for each stamp type item to be displayed;
   b. providing an icon file containing at least an image of an open file folder and an image of a closed file folder;
   c. providing a data base for all items currently displayed on the screen desk view, the data base having an entry for each item, said entry describing said item and including:
      i. the location of said item on the screen;
      ii. the type of item; and
      iii. in the case of the folder icon, the location of the image of the one of the open and closed folder images not being displayed, and the location of a data file for the folder contents;
   d. providing for each folder displayed a folder data file containing an entry for each stamp contained in the folder, said entries contained in said file in the same order that said stamps are in said folder, one on top of the other, said folder data file being implemented by a series of changeable doubly-linked files;
   e. displaying said desk view including at least one folder with said folder closed;
   f. in response to an input displaying an open folder using the location of said open folder image stored in the data entry for said closed folder to access the image of said open folder;
   g. displaying the stamps in said open folder with the stamp at the top of said folder visible;
   h. manipulating and rearranging said stamps in said folder on said screen;
   i. reordering said folder file as said stamps are rearranged; and
   j. displaying a closed file by responding to an input using the location of said closed file stored in the entry of said data base for said open file to access the image of said closed file.

29. In a data processing system including a video display, a method of providing a screen desk view including the display of icon type items and stamp type items, said icon type items including at least a folder icon and said stamp type items comprising at least one miniaturized image of a sheet of information, comprising:
   a. providing a stamp file containing stamp images for each stamp type item to be displayed;.
   b. providing an icon file containing at least an image of an open file folder and an image of a closed file folder;
   c. providing a data base for all items currently displayed on the screen desk view, the data base having an entry for each item, said entry describing said item and including:
      i. the location of said item on the screen;
      ii. the type of item; and
      iii. in the case of the folder icon, the location of the image of the one of the open and closed folder images not being displayed, and the location of a data file for the folder contents, said data base comprising a doubly-linked list;
   d. providing for each folder displayed a folder data file containing an entry for each stamp contained in the folder, said entries contained in said file in the same order that said stamps are in said folder, one on top of the other, said folder data file being implemented by a series of changeable doubly-linked files;
   e. displaying said desk view including at least one folder with said folder closed;
   f. in response to an input displaying an open folder using the location of said open folder image stored in the data entry for said closed folder to access the image of said open folder;
   g. displaying the stamps in said open folder with the stamp at the top of said folder visible;
   h. manipulating and rearranging said stamps in said folder on said screen;
   i. reordering said folder file as said stamps are rearranged; and
   j. displaying a closed file by responding to an input using the location of said closed file stored in the entry of said data base for said open file to access the image of said closed file.

30. In a data processing system having a video display for displaying a screen view with images of sheets of information and icons of desk accessories, a graphical icon in the screen view comprising
   a tab area,
   a first main body portion generally rectangular in shape with the tab area positioned adjacent one side of the rectangular shape so as to form a representation of a folder for holding images of desired sheets of information in a user established order,
   the representation being changeable between a graphical representation of a closed folder in which only said first main body portion and said tab area are displayed and
   a graphical representation of an open folder in which a second main body portion generally rectangular in shape disposed adjacent said first main body portion and approximately equal in size thereto is also displayed upon user activation of one of the main body and the tab area, and
   wherein, the first and second main body portions of the graphical representation of the open folder each hold a stack of sheets of information one on top of the other in user established order, the representation of a sheet on top of the stack held on either main body portion being moveable to a top of the stack held on the other main body portion such that the ordering of the sheets is maintained and the sheets in at least one stack are viewable one at a time.

* * * * *